US011654968B2

(12) United States Patent
Woo et al.

(10) Patent No.: US 11,654,968 B2
(45) Date of Patent: May 23, 2023

(54) CHASSIS FRAME MODULE FOR ELECTRIC VEHICLE

(71) Applicant: HYUNDAI MOBIS CO., LTD., Seoul (KR)

(72) Inventors: Hyun Jin Woo, Yongin-si (KR); Hyoun Young Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 42 days.

(21) Appl. No.: 17/380,398

(22) Filed: Jul. 20, 2021

(65) Prior Publication Data

US 2022/0017146 A1   Jan. 20, 2022

(30) Foreign Application Priority Data

Jul. 20, 2020   (KR) .................. 10-2020-0089578

(51) Int. Cl.
*B62D 21/12*   (2006.01)
*B62D 21/02*   (2006.01)
*B62D 27/02*   (2006.01)

(52) U.S. Cl.
CPC ............. *B62D 21/12* (2013.01); *B62D 21/02* (2013.01); *B62D 27/023* (2013.01)

(58) Field of Classification Search
CPC ........ B62D 21/02; B62D 21/12; B62D 21/18; B62D 27/023; B62D 27/065; B62D 65/02
USPC ........... 296/203.01–203.04, 29, 30; 286/781, 286/785
See application file for complete search history.

(56) References Cited

U.S. PATENT DOCUMENTS

| | | | | |
|---|---|---|---|---|
| 2,964,331 A | * | 12/1960 | Sherman | B62D 21/07 280/792 |
| 4,618,163 A | * | 10/1986 | Hasler | B62D 23/005 296/205 |
| 4,676,545 A | * | 6/1987 | Bonfilio | B62D 29/046 440/90 |
| 5,320,403 A | * | 6/1994 | Kazyak | B62D 23/005 296/205 |
| 5,593,245 A | * | 1/1997 | Herz | B62D 33/044 403/231 |
| 5,741,026 A | * | 4/1998 | Bonnville | B62D 29/008 280/288 |

(Continued)

FOREIGN PATENT DOCUMENTS

CN   107351794 A  * 11/2017  ............ B60R 19/02
CN   109204475 A  *  1/2019

(Continued)

OTHER PUBLICATIONS

Extended European Search Report dated Dec. 17, 2021 issued in European Patent Application No. 21186359.2.

*Primary Examiner* — Dennis H Pedder
(74) *Attorney, Agent, or Firm* — Morgan, Lewis & Bockius LLP

(57) ABSTRACT

A chassis frame module for an electric vehicle may include: a main frame; a front frame connected to the front of the main frame; and a rear frame connected to the rear of the main frame. The front frame may include: a first front frame disposed at the front of the main frame; a second front frame extending from the first front frame toward the main frame; and a front joint part configured to connect the main frame and the second front frame.

13 Claims, 8 Drawing Sheets

(56) References Cited

U.S. PATENT DOCUMENTS

| | | | | |
|---|---|---|---|---|
| 6,296,300 | B1 * | 10/2001 | Sato | B62D 29/008 |
| | | | | 296/203.02 |
| 6,299,240 | B1 * | 10/2001 | Schroeder | B62D 29/008 |
| | | | | 296/29 |
| 7,503,623 | B2 * | 3/2009 | Favaretto | B62D 23/005 |
| | | | | 280/798 |
| 7,766,388 | B1 * | 8/2010 | Marino | B62D 65/00 |
| | | | | 280/781 |
| 8,585,131 | B2 * | 11/2013 | Rawlinson | B62D 25/087 |
| | | | | 296/187.11 |
| 9,567,013 | B2 * | 2/2017 | Ehrlich | F16B 17/004 |
| 9,802,654 | B2 * | 10/2017 | Moss | B62D 25/2045 |
| 9,969,439 | B2 * | 5/2018 | Ehrlich | B62D 21/02 |
| 10,640,154 | B2 * | 5/2020 | Takii | B62D 65/02 |
| 11,161,548 | B2 * | 11/2021 | Lutz | B62D 29/048 |
| 2018/0162448 | A1 * | 6/2018 | Takahashi | B62D 21/15 |

FOREIGN PATENT DOCUMENTS

| | | | | |
|---|---|---|---|---|
| CN | 111315642 A | * | 6/2020 | ....... B29C 66/52441 |
| CN | 111372837 A | * | 7/2020 | ............. B62D 25/00 |
| DE | 102017124636 A1 | | 6/2018 | |
| DE | 102019006444 A1 | * | 3/2020 | |
| JP | 2000-103356 A | | 11/2000 | |
| KR | 10-2089486 B1 | | 3/2020 | |
| WO | 2011/065076 A1 | | 6/2011 | |

\* cited by examiner

CHASSIS FRAME MODULE FOR ELECTRIC VEHICLE

CROSS-REFERENCE TO RELATED APPLICATION

This application claims the benefit under 35 U.S.C. § 119(a) of Korean Patent Application No. 10-2020-0089578 filed on Jul. 20, 2020 in the Korean Intellectual Property Office, the entire disclosure of which is incorporated herein by reference for all purposes.

BACKGROUND

Field

Exemplary embodiments of the present disclosure relate to a chassis frame module for an electric vehicle, and more particularly, to a chassis frame module for an electric vehicle, which can be mounted in a limited space of an electric vehicle, and includes replaceable parts.

Discussion of the Background

In general, an electric vehicle refers to a vehicle which operates using electricity as power, and acquires driving energy by rotating a motor using electricity stored in a battery.

The chassis frame of such an electric vehicle is divided into a monocoque-type chassis frame and a frame-type chassis frame according to a manufacturing method, and the frame-type chassis frame forms one structure through a connection structure between an aluminum extruded material and a cast material and a connection structure between the extruded materials.

However, when repeated forces are applied to the assembled portion between the extruded material and the cast material and the assembled portion between the extruded materials in the conventional chassis frame, the coupling forces therebetween may be reduced. Therefore, there is a need for a technology capable of increasing the assembly strength between the extruded material and the cast material, the assembly strength between the extruded materials, and the endurances of the materials.

The related art of the present disclosure is disclosed in Korean Patent No. 10-2089486 registered on Mar. 10, 2020 and entitled "Chassis Platform Module for Electric Vehicle".

SUMMARY

Various embodiments are directed to a chassis frame module for an electric vehicle, which can be mounted in a limited space of an electric vehicle, and includes replaceable parts.

In an embodiment, a chassis frame module for an electric vehicle may include: a main frame; a front frame connected to a front of the main frame; and a rear frame connected to a rear of the main frame. The front frame may include: a first front frame disposed at the front of the main frame; a second front frame extending from the first front frame toward the main frame; and a front joint part configured to connect the main frame to the second front frame.

The front joint part may include: a front joint body part; a main frame support part protruding from the front joint body part and covering an outer surface of the main frame; and a front frame insertion part protruding from the front joint body part and inserted into the second front frame.

The front frame insertion part may have a width that decreases toward the second front frame.

The front frame insertion part may have a front tap hole formed therethrough, and the front tap hole may be connected to a front processing hole formed through the second front frame.

The front joint body part may have a hollow structure, and includes a plurality of front auxiliary reinforcement parts formed therein.

The rear frame may include: a first rear frame disposed at the rear of the main frame; a second rear frame mounted on the first rear frame; and a rear joint part having a first side connected to the second rear frame and a second side connected to the main frame.

The second rear frame may have a rear tap hole formed therethrough, and the rear tap hole may be connected to a rear processing hole formed through the rear joint part.

The rear joint part may have a hollow structure, and include a plurality of rear auxiliary reinforcement parts formed therein.

The rear frame further may include an auxiliary rear frame interposed between the main frame and the rear joint part, and having a first side connected to the main frame and a second side inserted into the rear joint part.

In accordance with the present disclosure, the chassis frame module for an electric vehicle may be mounted in a limited space of an electric vehicle, and include replaceable parts to reduce the repair cost.

Furthermore, since parts can be replaced, it is possible to reduce the distribution cost for the supply of required parts, thereby improving the productivity.

DETAILED DESCRIPTION OF THE ILLUSTRATED EMBODIMENTS

Hereinafter, a chassis frame module for an electric vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
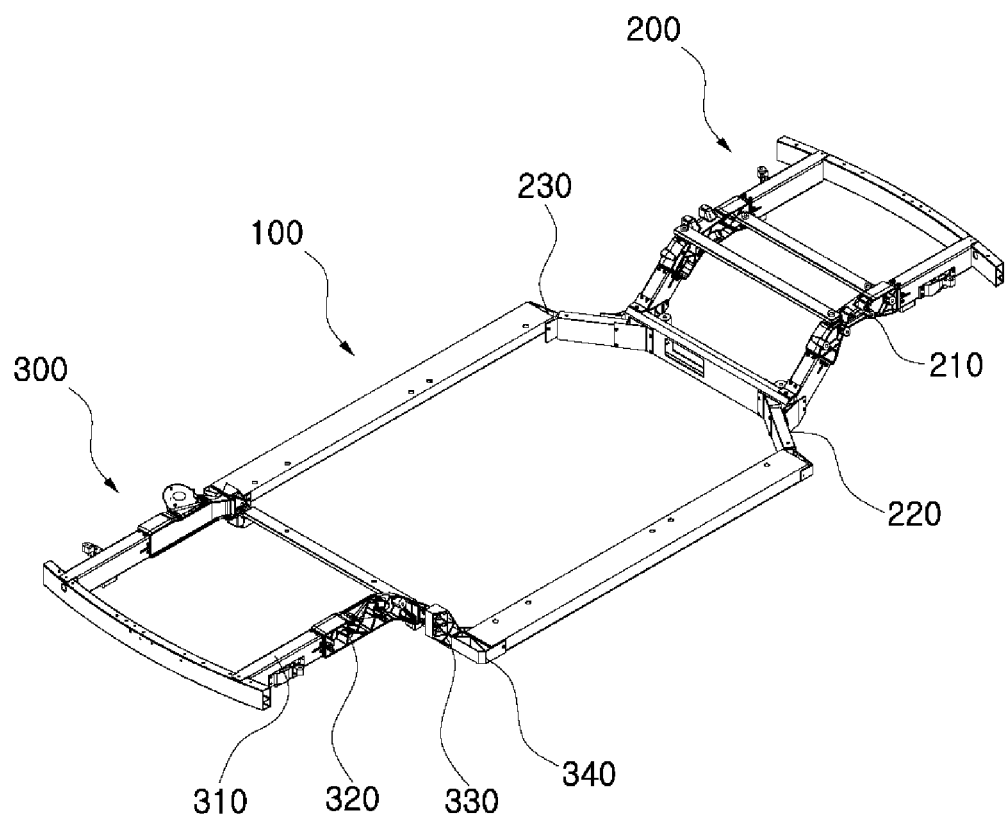
FIG. 1 is a perspective view schematically illustrating a chassis frame module for an electric vehicle in accordance with an embodiment of the present disclosure.
Figure 2:
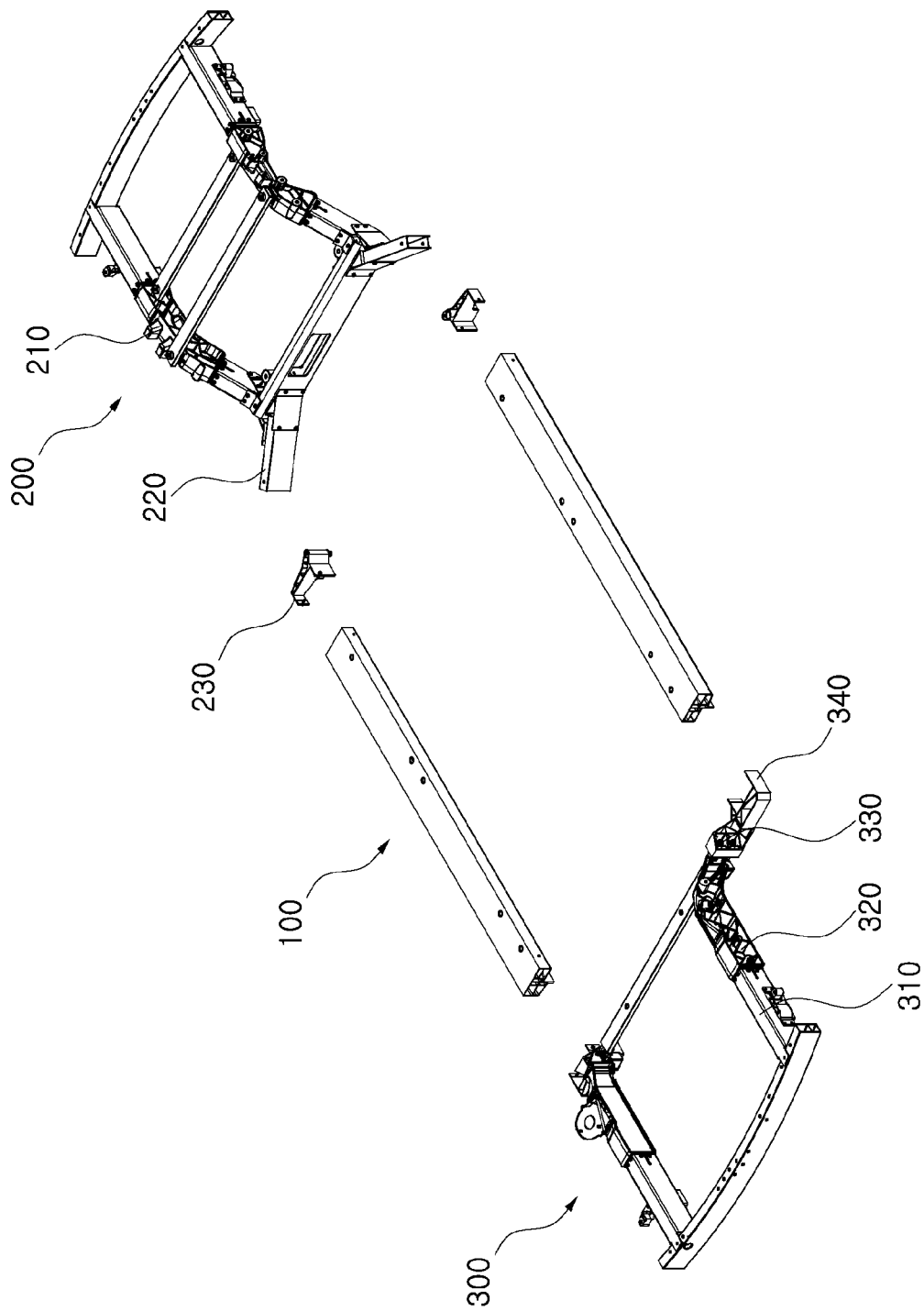
FIG. 2 is an assembled perspective view schematically illustrating the chassis frame module for an electric vehicle in accordance with the embodiment of the present disclosure.
Figure 3:
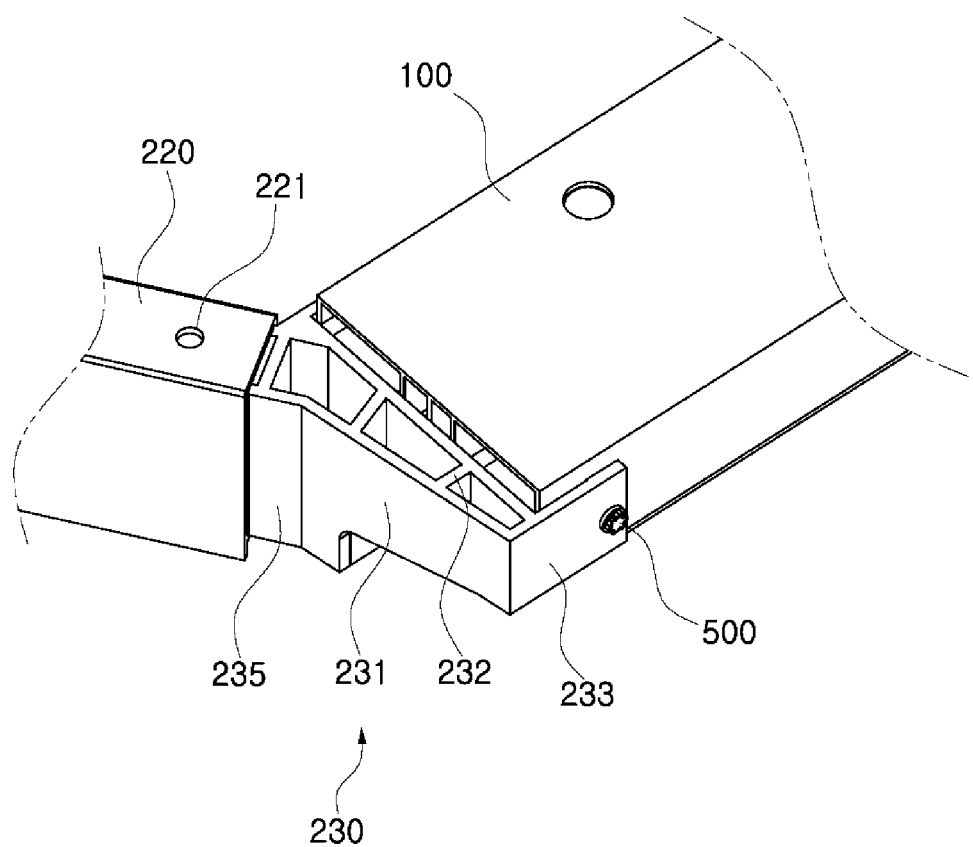
FIG. 3 is a partially expanded view schematically illustrating a main frame and a front frame in the chassis frame module for an electric vehicle in accordance with the embodiment of the present disclosure.
Figure 4:
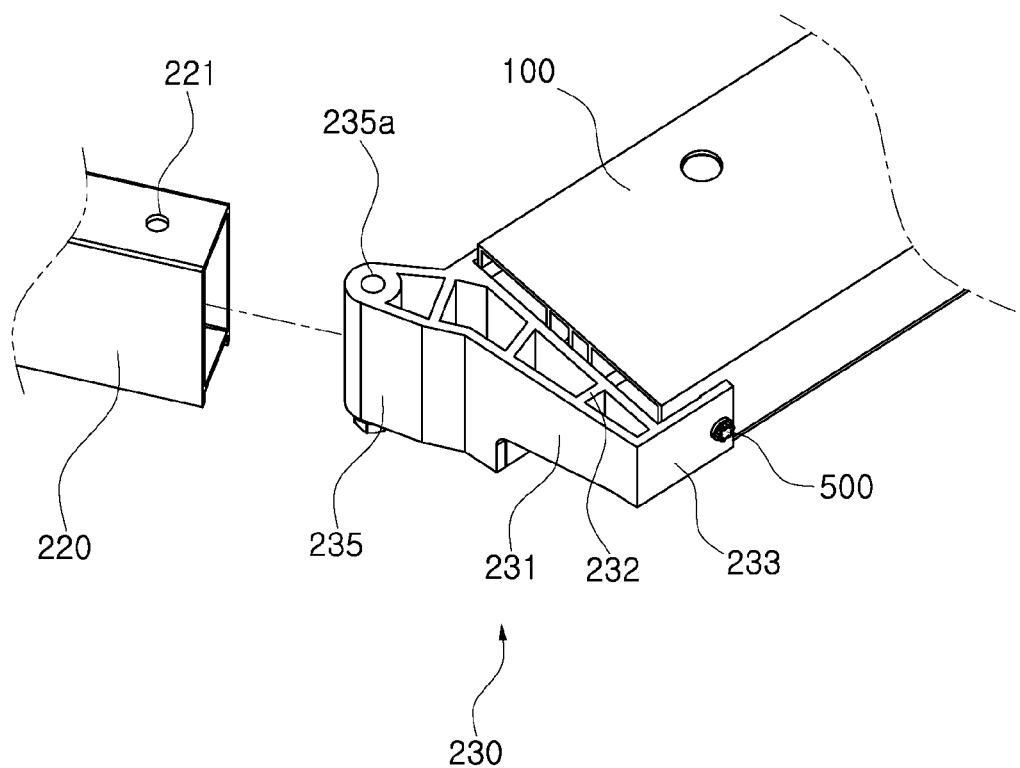
FIG. 4 is a partially expanded view schematically illustrating that the main frame and the front frame in the chassis frame module for an electric vehicle in accordance with the embodiment of the present disclosure are coupled to each other.
Figure 5:
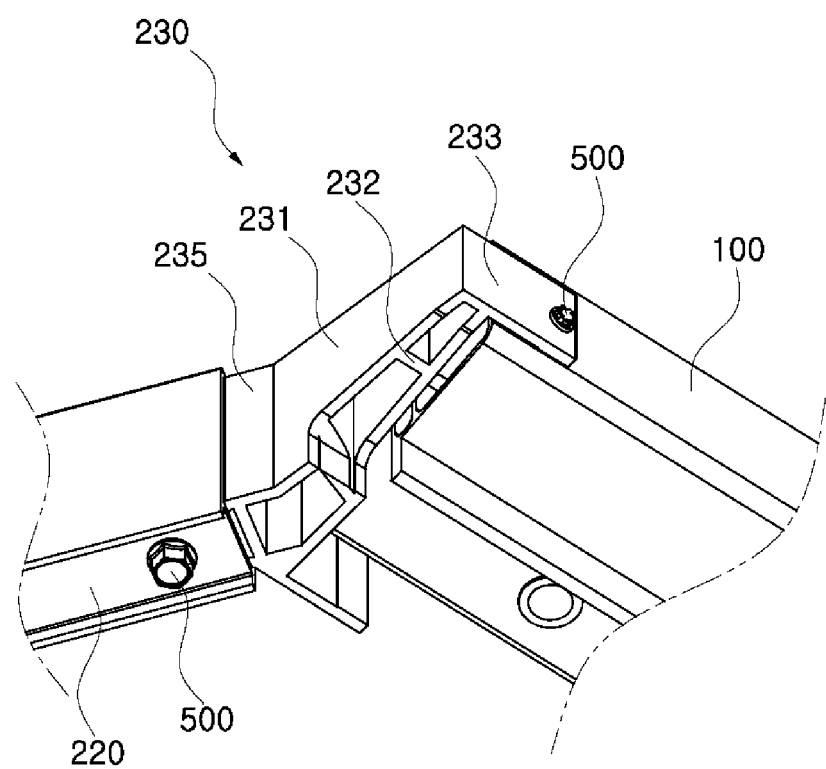
FIG. 5 is a partially expanded bottom view schematically illustrating the main frame and the front frame in the chassis frame module for an electric vehicle in accordance with the embodiment of the present disclosure.
Figure 6:
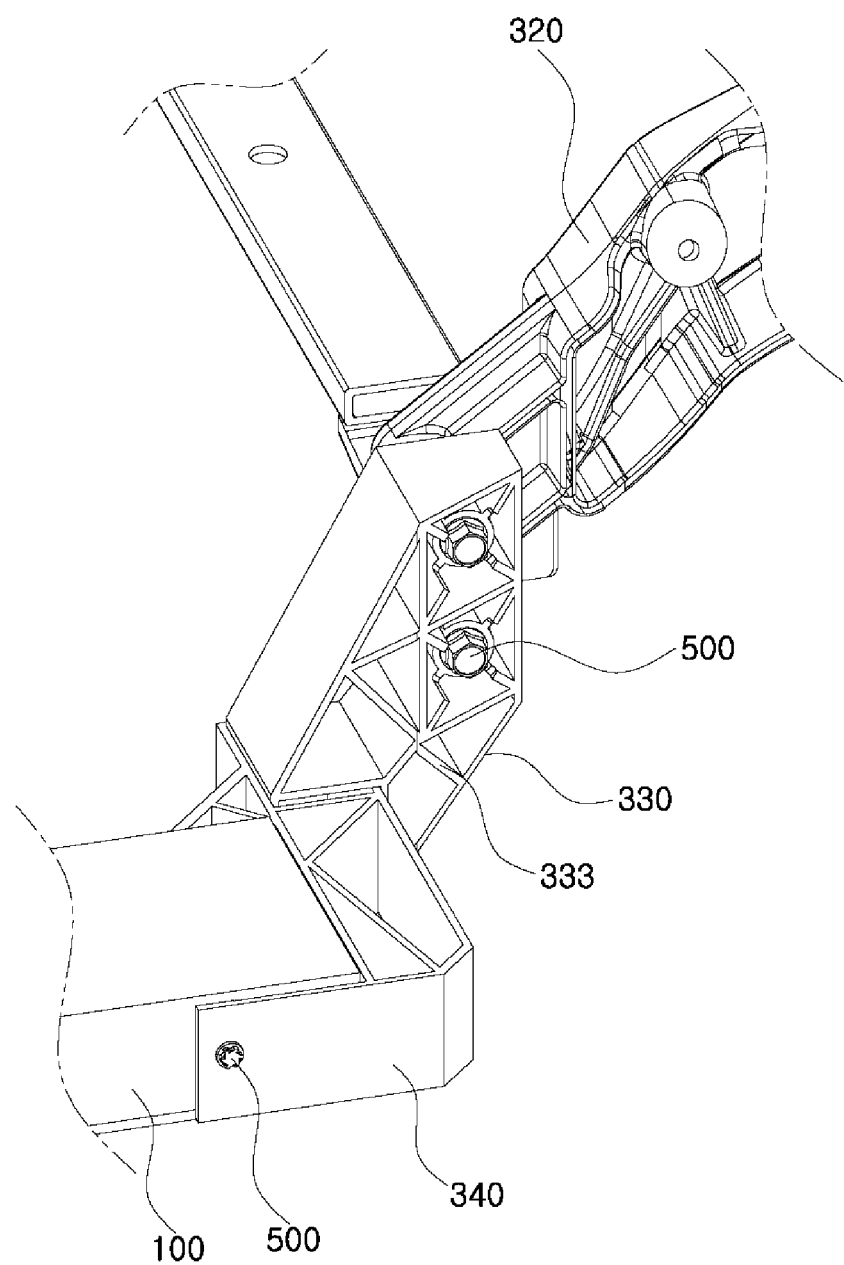
FIG. 6 is a partially expanded view schematically illustrating the main frame and a rear frame in the chassis frame module for an electric vehicle in accordance with the embodiment of the present disclosure.
Figure 7:
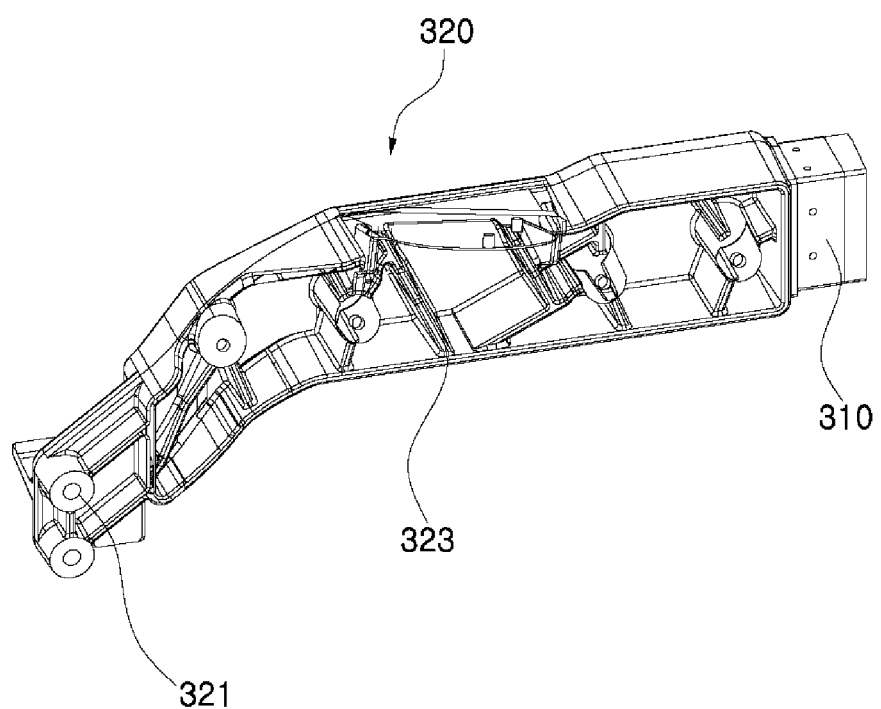
FIG. 7 is a bottom perspective view schematically illustrating the rear frame in the chassis frame module for an electric vehicle in accordance with the embodiment of the present disclosure.
Figure 8:
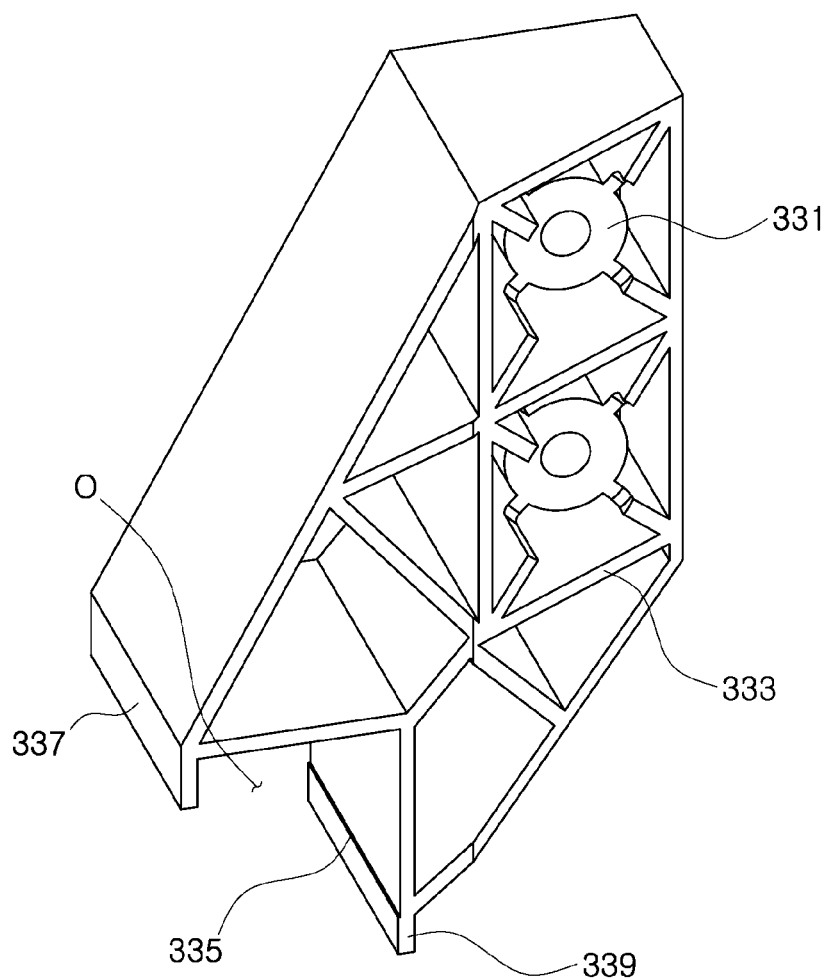
FIG. 8 is a bottom perspective view schematically illustrating a rear joint part in the chassis frame module for an electric vehicle in accordance with the embodiment of the present disclosure.

FIG. 1 is a perspective view schematically illustrating a chassis frame module for an electric vehicle in accordance with an embodiment of the present disclosure, FIG. 2 is an assembled perspective view schematically illustrating the chassis frame module for an electric vehicle in accordance with the embodiment of the present disclosure, FIG. 3 is a partially expanded view schematically illustrating a main frame and a front frame in the chassis frame module for an electric vehicle in accordance with the embodiment of the present disclosure, FIG. 4 is a partially expanded view schematically illustrating that the main frame and the front frame in the chassis frame module for an electric vehicle in accordance with the embodiment of the present disclosure are coupled to each other, FIG. 5 is a partially expanded bottom view schematically illustrating the main frame and the front frame in the chassis frame module for an electric vehicle in accordance with the embodiment of the present disclosure, FIG. 6 is a partially expanded view schematically illustrating the main frame and a rear frame in the chassis frame module for an electric vehicle in accordance with the embodiment of the present disclosure, FIG. 7 is a bottom perspective view schematically illustrating the rear frame in the chassis frame module for an electric vehicle in accordance with the embodiment of the present disclosure, and FIG. 8 is a bottom perspective view schematically illustrating a rear joint part in the chassis frame module for an electric vehicle in accordance with the embodiment of the present disclosure.

Referring to FIGS. 1 to 8, the chassis frame module for an electric vehicle in accordance with the embodiment of the present disclosure includes a main frame 100, a front frame 200 and a rear frame 300.

The main frame 100 on which a battery (not illustrated) of an electric vehicle is disposed includes a pair of side frames. The front frame 200 is connected to the front (right side in FIG. 1) of the main frame 100, and located on a front-wheel side of the vehicle. The rear frame 300 is connected to the rear (left side in FIG. 1) of the main frame 100, and located on a rear-wheel side of the vehicle.

The front frame 200 includes a first front frame 210, a second front frame 220 and a front joint part 230. The first front frame 210 is disposed on the front side (right side in FIG. 2) of the main frame 100.

The second front frame 220 extends from the first front frame 210 toward the main frame 100. In the present disclosure, the second front frame 220 is inclined and extending from the first front frame 210 according to the width of the main frame 100.

The front joint part 230 connects the main frame 100 and the second front frame 220. The front joint part 230 may detachably connect the main frame 100 and the second front frame 220, such that each of the main frame 100 and the front frame 200 can be modularized. Therefore, part replacement, repair and movement may be easily performed.

The front joint part 230 includes a front joint body part 231, a main frame support part 233 and a front frame insertion part 235. The main frame support part 233 is formed on a first side (right side in FIG. 4) of the front joint body part 231, and the front frame insertion part 235 is formed on a second side (left side in FIG. 4) of the front joint body part 231.

The main frame support part 233 protrudes from the front joint body part 231 so as to cover the outer surface of the main frame 100. The main frame support part 233 is formed on the front joint body part 231 so as to correspond to the width of the main frame 100, thereby covering the outer surface of the main frame 100. The main frame support part 233 is fixed by a fastener 500, while covering the main frame 100.

In the present disclosure, the fastener 500 has a structure on which a bolt or screw is formed. The main frame support part 233 and the main frame 100 may be fastened to each other through the fastener 500, and thus reliably maintain the coupling state. As the fastener 500 is removed, the main frame support part 233 and the main frame 100 may be easily separated from each other. The size of the fastener 500 may be changed according to the size of a hole into which the fastener 500 is fastened.

The front joint body part 231 has a hollow structure, and includes a plurality of front auxiliary reinforcement parts 232 formed therein. The plurality of front auxiliary reinforcement parts 232 serve to connect the inner surfaces of the hollow front joint body part 231, and are disposed on the inner surfaces of the front joint body part 231. In the present disclosure, the front auxiliary reinforcement parts 232 may be disposed as a truss structure or ladder structure in the front joint body part 231.

The front frame insertion part 235 protrudes from the front joint body part 231, and is inserted into the second front frame 220. The front frame insertion part 235 has a width that decreases from the front joint body part 231 toward the second front frame 220. That is, the front frame insertion part 235 is formed in a triangle shape in the front joint body part 231. Since the front frame insertion part 235 has a width that decreases toward the second front frame 220, the front frame insertion part 235 may be easily inserted into the second front frame 220, and easily separated from the second front frame 220.

The front frame insertion part 235 has a front tap hole 235a formed therethrough, and the front tap hole 235a is screwed to a front processing hole 221 formed through the second front frame 220 by the fastener 500. The front tap hole 235a and the front processing hole 221 each have a screw thread formed thereon, and thus can be screwed to the fastener 500.

The rear frame 300 includes a first rear frame 310, a second rear frame 320 and a rear joint part 330. The first rear frame 310 is disposed on the rear side (left side in FIG. 1) of the main frame 100.

The second rear frame 320 is mounted on the first rear frame 310 in the longitudinal direction of the first rear frame 310.

The rear joint part 330 has a first side (right side in FIG. 6) connected to the second rear frame 320 and a second side (left side in FIG. 6) connected to the main frame 100. The second rear frame 320 and the main frame 100 are detachably connected by the rear joint part 330. In the present disclosure, the rear joint part 330 may detachably connect the second rear frame 320 and the main frame 100. Alternatively, the main frame 100 and the rear joint part 330 connected to the second rear frame 320 may be detachably connected by an auxiliary rear frame 340 which will be described below.

The second rear frame 320 has a rear tap hole 321 formed therethrough, and the rear tap hole 321 is screwed to a rear processing hole 331 formed through the rear joint part 330 by the fastener 500. The rear tap hole 321 and the rear processing hole 331 each have a screw thread formed thereon, and thus can be screwed to the fastener 500.

The rear joint part 330 has a hollow structure, and includes a plurality of rear auxiliary reinforcement parts 333 formed therein. The plurality of rear auxiliary reinforcement parts 333 serve to connect the inner surfaces of the hollow rear joint part 330, and are disposed on the inner surfaces of the rear joint part 330. In the present disclosure, the rear auxiliary reinforcement parts 333 may be disposed as a truss structure or ladder structure in the rear joint part 330.

In the present disclosure, the rear frame 300 further includes the auxiliary rear frame 340. The auxiliary rear frame 340 is interposed between the main frame 100 and the rear joint part 330, and has a first side (left side in FIG. 6) screwed to the main frame 100 by the fastener 500 and a second side (right side in FIG. 6) inserted into the rear joint part 330. The main frame 100 and the rear joint part 330 may be easily coupled to and decoupled from each other by the auxiliary rear frame 340.

According to one embodiment of the present disclosure, the rear joint part 330 includes one end having an open slot O, into which the second side of the auxiliary rear frame 340 is inserted. The open slot O of the second rear frame 320 includes a first protrusion 337 extending from one end thereof and a second protrusion 339 extending from another end thereof. The first protrusion 337 of the open slot O is coupled to an inner surface of the auxiliary rear frame 340, and the second protrusion 339 of the open slot O is coupled to an outer surface of the auxiliary rear frame 340. A groove 335 is formed on an inner surface of the second protrusion 339 of the open slot O, and the auxiliary rear frame 340 is slidably joined to the open slot O along the groove 335.

The chassis frame module for an electric vehicle in accordance with the present disclosure may be mounted in a limited space of an electric vehicle, and include replaceable parts to reduce the repair cost.

Furthermore, since parts can be replaced, it is possible to reduce the distribution cost for the supply of required parts, thereby improving the productivity.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A chassis frame module for an electric vehicle, comprising:
 a main frame;
 a front frame connected to a front of the main frame; and
 a rear frame connected to a rear of the main frame,
 wherein the front frame comprises:
 a first front frame disposed at the front of the main frame;
 a second front frame extending from the first front frame toward the main frame; and
 a front joint part configured to connect the main frame to the second front frame,
 wherein the front joint part comprises:
 a front joint body part;
 a main frame support part protruding from the front joint body part, and covering an outer surface of the main frame; and
 a front frame insertion part protruding from the front joint body part and inserted into the second front frame, and
 wherein the front joint body part, the main frame support part, and the front frame insertion part are integrally formed with each other.

2. The chassis frame module of claim 1, wherein the front frame insertion part has a width that decreases toward the second front frame.

3. The chassis frame module of claim 1, wherein the front frame insertion part has a front tap hole formed therethrough,
 wherein the front tap hole is connected to a front processing hole formed through the second front frame.

4. The chassis frame module of claim 1, wherein the front joint body part has a hollow structure, and includes a plurality of front auxiliary reinforcement parts formed therein.

5. The chassis frame module of claim 1, wherein the rear frame comprises:
 a first rear frame disposed at the rear of the main frame;
 a second rear frame mounted on the first rear frame; and
 a rear joint part having a first side connected to the second rear frame and a second side connected to the main frame.

6. The chassis frame module of claim 5, wherein the second rear frame has a rear tap hole formed therethrough,
 wherein the rear tap hole is connected to a rear processing hole formed through the rear joint part.

7. The chassis frame module of claim 5, wherein the second rear frame and the main frame are detachably coupled to each other by the rear joint part.

8. The chassis frame module of claim 5, wherein the rear joint part has a hollow structure, and includes a plurality of rear auxiliary reinforcement parts formed therein.

9. The chassis frame module of claim 5, wherein the rear frame further comprises an auxiliary rear frame interposed between the main frame and the rear joint part, and having a first side connected to the main frame and a second side connected into the rear joint part.

10. The chassis frame module of claim 9, wherein the rear joint part and the main frame are detachably coupled to each other by the auxiliary rear frame.

11. The chassis frame module of claim 10, wherein the rear joint part includes one end having an open slot, into which the second side of the auxiliary rear frame is inserted.

12. The chassis frame module of claim 11, wherein the open slot of the rear joint part includes a first protrusion extending from one end thereof and a second protrusion extending from another end thereof, and
 the first protrusion of the open slot is coupled to an inner surface of the auxiliary rear frame, and the second protrusion of the open slot is coupled to an outer surface of the auxiliary rear frame.

13. The chassis frame module of claim 12, wherein a groove is formed on an inner surface of the second protrusion of the open slot, and
 the auxiliary rear frame is slidably joined to the open slot along the groove.

* * * * *